(12) United States Patent
Kudinova et al.

(10) Patent No.: US 11,550,776 B2
(45) Date of Patent: Jan. 10, 2023

(54) DOUBLE-RECORD-KEEPING OF APP DATA AT SOFTWARE PLATFORM FOR VERIFICATION AND FEEDBACK

(71) Applicant: SHOPIFY INC., Ottawa (CA)

(72) Inventors: Olga Kudinova, Toronto (CA); Korosh Koochekian Sabor, Montreal (CA); Derek Pyne, Toronto (CA)

(73) Assignee: SHOPIFY INC., Ottawa (CA)

( * ) Notice: Subject to any disclaimer, the term of this patent is extended or adjusted under 35 U.S.C. 154(b) by 52 days.

(21) Appl. No.: 17/201,331

(22) Filed: Mar. 15, 2021

(65) Prior Publication Data

US 2022/0292075 A1 Sep. 15, 2022

(51) Int. Cl.
*G06F 16/00* (2019.01)
*G06F 16/23* (2019.01)
*G06F 16/2455* (2019.01)

(52) U.S. Cl.
CPC .... *G06F 16/2365* (2019.01); *G06F 16/24565* (2019.01)

(58) Field of Classification Search
CPC ...... G06F 8/65; G06F 11/3438; G06F 16/903; G06F 16/9538; G06F 17/18; G06F 8/77; G06F 11/076; G06F 11/0772; G06F 11/3051; G06F 11/3096; G06F 11/323; G06F 11/3409; G06F 11/3466; G06F 11/3495; G06F 2201/865; G06F 21/602; G06F 21/6245; G06F 16/21; G06F 16/215; G06F 16/2237; G06F 16/244; G06F 16/245; G06F 16/24558; G06F 16/24568; G06F 16/2457; G06F 16/248; G06F 16/254; G06F 16/288; G06F 2212/465; G06F 40/40; G06F 9/226; G06F 9/5027; G06F 9/5072; G06F 9/5077; G06F 9/542; H04L 67/10; H04L 41/0896; H04L 41/40; G06N 20/00; G06N 3/08

See application file for complete search history.

(56) References Cited

U.S. PATENT DOCUMENTS

| | | | |
|---|---|---|---|
| 10,936,462 B1 * | 3/2021 | Eardley | G06F 11/0772 |
| 2018/0048525 A1 * | 2/2018 | Karasaridis | H04L 69/40 |
| 2019/0171438 A1 * | 6/2019 | Franchitti | G06N 20/00 |
| 2020/0150949 A1 * | 5/2020 | Jewkes | G06F 8/65 |
| 2021/0090694 A1 * | 3/2021 | Colley | G16B 40/00 |

* cited by examiner

*Primary Examiner* — Shyue Jiunn Hwa

(57) ABSTRACT

Systems and methods are provided for identifying a mismatch between data maintained by third party apps that provide extended functionality to a software platform, and metrics generated in the software platform based on interactions with the third party apps. This can be used to trigger appropriate actions such as, for example, corrective actions to remedy the mismatch. As a result, data consistency between the software platform and the app may be monitored and maintained.

20 Claims, 6 Drawing Sheets

FIG. 5

DOUBLE-RECORD-KEEPING OF APP DATA AT SOFTWARE PLATFORM FOR VERIFICATION AND FEEDBACK

FIELD

The application relates to software platforms that are extensible through the use of apps, and, more particularly, to data maintained by the software platform and the apps, and, yet more particularly, to maintaining consistency between data maintained by software platforms and apps.

BACKGROUND

A software platform typically provides a base product with a certain set of features, and then provides extensibility opportunities (e.g. extension points or APIs) for third parties to develop apps to extend the core functionality (base feature set) of the base product. Platform users (i.e. merchants in the case of a commerce platform) can then decide which third-party apps they wish to install on their software instances (i.e. stores) to configure their particular instance of the base product according to their own unique needs. As such, in terms of further development of the platform, development efforts can be focused on building features for popular use cases of its platform users, and the third-party apps are able to fill in the remaining gaps.

Typically, various metrics and information will be made available to users (e.g. merchants) directly from a third-party app. This may be available outside the software platform. In addition, users may be able to obtain metrics and information directly from the software platform. In the case that there is a mismatch between information made available through the third-party app, and information made available through the software platform, this can erode user confidence in overall system functionality.

SUMMARY

Systems and methods are provided that allow metrics pertaining to the use of a third party to be maintained on a software platform based on the ongoing activities of the software platform as a result of interactions with the third party app. These metrics can be compared with app data obtained from the app, and discrepancies identified. It is problematic for there to be a mismatch between metrics maintained on the software platform, and the data available from the app itself.

According to one aspect of the present invention, there is provided a computer-implemented method comprising: receiving, in a software platform providing core functionality, input from a third-party app in respect of a feature implemented by the third-party app to supplement the core functionality, the input being input to an orchestration of a flow of events on the software platform; based on the input and/or the flow of events, maintaining at least one metric relevant to the feature being implemented by the third-party app, the at least one metric intended to correspond to data maintained by the third-party app; obtaining from the third-party app, the data maintained by the third-party app and to which the at least one metric is intended to correspond; performing a comparison based on the obtained data and the at least one metric to produce at least one compare result; and triggering at least one action by the software platform based on the at least one compare result.

Optionally, the software platform has an extension point, and wherein the step of receiving input from a third-party app in respect of a feature implemented by the third-party app to supplement the core functionality occurs via the extension point.

Optionally, triggering at least one action by the software platform based on the at least one compare result comprises triggering an action when there is a match, or a match within a defined tolerance, between the obtained data and the at least one metric.

Optionally, triggering at least one action by the software platform based on the at least one compare result comprises triggering an action when there is a mis-match between the obtained data and the at least one metric, or a mis-match between the obtained data and the at least one metric that exceeds a defined tolerance.

Optionally, the at least one triggered action comprises a corrective action.

Optionally, the corrective action is one of: an action to resynchronize a state of the app and the software platform; one or more self-healing actions to rectify an inconsistency; or sending an automated request to the app requesting that a most recent set of events be re-sent by the app to the software platform.

Optionally, the at least one action comprises providing an indication of the compare result.

Optionally, providing an indication of the compare result comprises: informing the app or a person associated with the app of the compare result; transmitting a message to an app developer informing the app developer of the compare result; and informing a user of the software platform of the compare result.

Optionally, the method further comprises: making one or more of said at least one metric or information based on one or more of said at least one metric available to a user through a user interface of the software platform.

Optionally, making the at least one metric available to a user through a user interface of the software platform comprises making the at least one metric available through a store administration user interface.

Optionally, the software platform is a commerce platform, and the feature implemented by the third-party app is a subscription feature.

Optionally, the at least one metric comprises: monthly recurring revenue; number of active subscriptions; number of active subscribers (customers)

Optionally, obtaining app data from the third-party app comprises obtaining app data from the third-party app using at least one of: one or more endpoints; a push mechanism; or a pull mechanism.

Optionally, the app data comprises at least one aggregated metric.

According to another aspect of the present invention, there is provided an apparatus comprising: a processor and a memory, the apparatus configured to execute a method comprising: receiving, in a software platform providing core functionality, input from a third-party app in respect of a feature implemented by the third-party app to supplement the core functionality, the input being input to an orchestration of a flow of events on the software platform; based on the input and/or the flow of events, maintaining at least one metric relevant to the feature being implemented by the third-party app, the at least one metric intended to correspond to data maintained by the third-party app; obtaining from the third-party app, the data maintained by the third-party app and to which the at least one metric is intended to correspond; performing a comparison based on the obtained data and the at least one metric to produce at least one compare result; and triggering at least one action by the software platform based on the at least one compare result.

Optionally, the software platform has an extension point, and wherein the step of receiving input from a third-party app in respect of a feature implemented by the third-party app to supplement the core functionality occurs via the extension point.

Optionally, triggering at least one action by the software platform based on the at least one compare result comprises triggering an action when there is a mis-match between the obtained data and the at least one metric, or a mis-match between the obtained data and the at least one metric that exceeds a defined tolerance.

Optionally, the at least one triggered action comprises a corrective action.

Optionally, the corrective action is one of: an action to resynchronize a state of the app and the software platform; one or more self-healing actions to rectify an inconsistency; or sending an automated request to the app requesting that a most recent set of events be re-sent by the app to the software platform.

According to another aspect of the present invention, there is provided a computer-readable medium having instructions stored thereon that, when executed by a computer, cause the computer to perform a method comprising: receiving, in a software platform providing core functionality, input from a third-party app in respect of a feature implemented by the third-party app to supplement the core functionality, the input being input to an orchestration of a flow of events on the software platform; based on the input and/or the flow of events, maintaining at least one metric relevant to the feature being implemented by the third-party app, the at least one metric intended to correspond to data maintained by the third-party app; obtaining from the third-party app, the data maintained by the third-party app and to which the at least one metric is intended to correspond; performing a comparison based on the obtained data and the at least one metric to produce at least one compare result; and triggering at least one action by the software platform based on the at least one compare result.

BRIEF DESCRIPTION OF THE DRAWINGS

Embodiments of the disclosure will now be described with reference to the attached drawings in which:

FIG. 5 is an example of a home page of a merchant, according to one embodiment.

DETAILED DESCRIPTION

Figure 1:
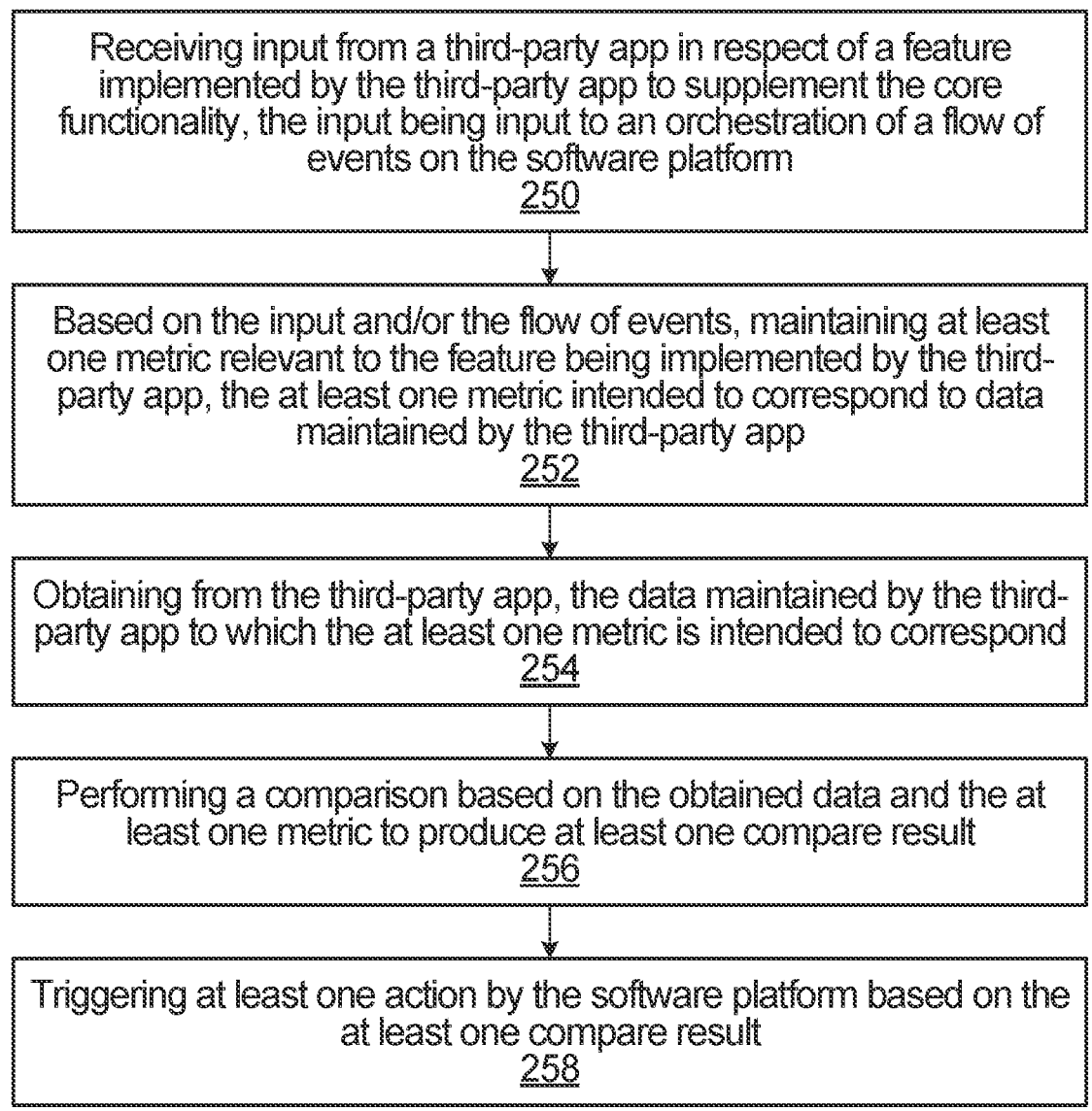
FIG. 1 is a flowchart of a method of double record keeping of app data at software platform for verification and feedback.

An example of an extensible software platform is a commerce platform having extensibility features such as, for example, an extensible checkout functionality, and a specific feature that may be implemented through a third-party app is a subscription feature. Such a platform allows third-party app developers to build apps for merchants which allow them to accept subscription orders from buyers. Subscriptions are complex to implement, and as such may not necessarily be directly or completely implemented by a commerce platform. Due to the inclusion of the extensible checkout, third-party app developers can develop their own apps to handle all of the logistics of subscriptions for merchants, and the platform is integrated to receive the resulting outcomes of these subscriptions from the app (e.g. orders, cancellations, refunds). For example, for each purchased subscription, the app may place an appropriate set of orders on the platform at the right cadence, e.g. one order placed on the 15th day of each month for the next 6 months.

In addition, although the platform may not build and manage the functionality of a certain commerce feature being implemented by a third-party app, it might wish to share reporting, metrics, or analytics to platform users relevant to the feature. This is true for subscriptions, where it would be advantageous for the commerce platform to be able to report on subscription metrics (such as MRR (monthly recurring revenue), number of active subscriptions, number of active subscribers (customers), etc.) directly in the platform (for example in a merchant's Store Administration interface).

The detailed management of the commerce feature is implemented by the app, and the app acts as a source of truth for its own domain of information (e.g. the storage and logistics of managing subscriptions). The app orchestrates a flow of events on the software platform, for example the addition of the periodic set of orders on the platform. The platform builds its metrics for reporting purposes based on the flow of events on the software platform, as orchestrated, at least in part, by the app.

An up-to-date flow of events at the platform should be correctly and reliably orchestrated such that the state of the system (and therefore the reporting of metrics by the software platform) is consistent across both the app and the platform.

The extensibility of the platform may be utilized to enable delegating or outsourcing a piece of functionality (and its associated record-keeping) to a component (app), and with the expectation or agreement that the component will keep the platform up-to-date on any outcomes such as, for example, in order for the platform to report or make decisions related to that functionality. As an example, with subscriptions, the platform would be relying on a timely and correct number of orders to be placed on the platform by the app. Any discrepancy or delay in this flow could result in the app reporting a certain value for a subscription metric, and the platform reporting a different value for the same metric.

While the agreement implies a certain level of trust between the platform and the app, this trust is not always warranted. A given app may behave unexpectedly, poorly, or maliciously (e.g. due to bugs, missing code, server/network issues, malicious behaviour, etc.), resulting in the platform reporting incorrect metrics to the user. This may be detrimental to the platform as it damages the user's trust in the platform.

The provided system can be used to identify such discrepancies and to trigger appropriate actions such as, for example, corrective actions to remedy the mismatch. Conveniently, in this way, data consistency between a software platform and an app may be monitored, maintained, and/or provided. The system is described in detail below as it would apply to providing data consistency between a software platform and a single app. More generally, there may be multiple apps that provide extended functionality to the software platform, and this same approach can be implemented for each of the apps.

With reference to FIG. 1, shown is a flowchart of a computer-implemented method in a software platform providing core functionality, for double-record-keeping of app data at the software platform for verification and feedback.

The method begins in block 250 with receiving input from a third-party app in respect of a feature implemented by the third-party app to supplement the core functionality, the input being input to an orchestration of a flow of events on the software platform. The flow of events on the software platform may be affected by the input from third-party apps in various ways. Examples include:

a. Changing a data field;
b. Filling in a previously empty data field;
c. Executing a step;
d. Adding a record;
e. Controlling which step is executed next.

The method continues in block 252 with, based on the input and/or the flow of events, maintaining at least one metric relevant to the feature being implemented by the third-party app, the at least one metric intended to correspond to data maintained by the third-party app.

The platform maintains its own metrics based on its interactions with an App. For example, for the example involving a third party app providing subscription functionality, when the App instructs the App to add/remove a subscription to a store, the platform can increment/decrement a metric representing a number of subscriptions for the store. The platform makes these metrics, and/or other information determined by the platform based on the metrics, available to platform users through the platform. Value added functionality may be provided that involves combining the metrics determined based on interactions with the App, and other information available on the platform.

At the same time, the app maintains its own app metrics and/or information, hereinafter app data. Some or all of the app data may be made available to users through an App UI. For example, the app may also maintain data representing a number of subscriptions in a given store. In addition, certain app data is made available to the platform for the purpose of comparison with the platform generated metrics.

The method continues in block 254 with obtaining from the third-party app, the data maintained by the third-party app to which the at least one metric is intended to correspond. This step is separate from the interaction between the platform and the app that takes place as part of executing the feature provided by the app. A main purpose of this step is to allow validation and verification steps to be performed.

Note that the app data maintained by the app, and the metrics generated by the platform are not necessarily identical in form in the sense that they represent the same information. For example, while the platform may maintain "current number of active subscribers" based on instructions to add and remove subscribers received one at a time from the app, the information from the app may be in the form of "subscribers added today", and "subscribers removed today" maintained on a per date basis.

The method continues in block 256 with performing a comparison based on the obtained data and the at least one metric to produce at least one compare result. This can be used to identify similarities (e.g. a match or a match within a tolerance) and/or discrepancies (for example a mismatch or a mismatch greater than a tolerance). In the event the app data and the metrics represent the same information, this comparison can be made directly. For example, if the app data made available to the platform includes a "current number of active subscribers" value, this can be compared directly with the corresponding value generated by the platform. In the event the app data and the metrics do not represent the same information, some processing of the data (either the app data or the platform data) prior to making a comparison may be necessary. For example, if the app data made available to the platform includes "subscribers added today", and "subscribers removed today" on a per date basis, this can be processed to generate a "current number of active subscribers" value (i.e., by adding the number of added subscribers to and subtracting the number of removed subscribers from a running total (e.g. from the previous day) in order to maintain a current number of subscribers/number of net subscribers) that can then be directly compared to the same metric generated on the platform.

The compare result may, for example, be indicative of whether the obtained app data agrees, or agrees within a tolerance, disagrees, or disagrees by an amount greater than a tolerance, with the generated metrics. The compare result may also or alternatively indicate a difference value reflecting a difference between the obtained app data and the generated metric. Where multiple metrics are generated by the platform, there may be a corresponding number of compare results.

The method continues in block 258 with triggering at least one action by the software platform based on the at least one compare result. The compare results can be used to trigger various actions that may include, for example, corrective actions, and actions that involve sending or otherwise providing an indication of the compare result. The actions may be the same or different for different metrics or may depend on a combination of conditions for multiple metrics.

One example of a potentially triggered corrective action is a self-healing action to rectify an inconsistency (reconciliation). An example of a self-healing action involves sending an automated request that a most recent set of events be re-sent by the app to the software platform. The platform can then rebuild a correct database state from the set of events received from the app (e.g. parse out the ones that had already been successfully received and apply the ones that are new), and/or recalculate the metrics.

Another example of a potentially triggered action involves informing the app, or a person associated with the app, such as the app developer, of the compare result, with the expectation that the app will rectify the situation going forward. This can be as simple as transmitting a message to the app, advising the app of the inconsistency. This can be in the form of a scheduled report of the compare result, or a report that is sent asynchronously only when there is an inconsistency. There may be a channel for providing the comparison information to the app via the app's API.

Another example of a potentially triggered action involves monitoring, by the platform, for apps that have repeated discrepancies (e.g. a certain number of discrepancies in a certain period of time) and flagging these for further action or sending relevant feedback to the app. The system may also potentially take automated actions against these apps, such as automatically restricting the app from any further participation in the feature (e.g. prevent it from taking any further subscriptions).

Another example of a potentially triggered action involves sending/making available a notification to a platform user such as a merchant (e.g. a banner at the top of their Subscription Metrics report in their Store Admin) to notify them that their subscription data is currently out-of-sync and may not be perfectly accurate at the moment.

In another example of a potentially triggered action, if a discrepancy is found, one or more features in the software platform that rely on the metrics may be disabled or hidden. For instance, some subscription metrics may be hidden if a discrepancy with the subscription data is found.

The triggered actions can assist in maintaining data consistency between a software platform and an app may be monitored, maintained, and/or provided, or at the very least ensure that relevant parties are aware where there is a data inconsistency such that appropriate action can take place. Where the software platform executes automated functionality that depends on the accuracy of the maintained metrics, in some embodiments, the automated functionality is paused pending rectification of the situation, avoiding unnecessary processing on the software platform, and avoiding the accumulation of further errors/inconsistencies in the software platform stemming from providing the functionality based on erroneous metrics.

Figure 2:
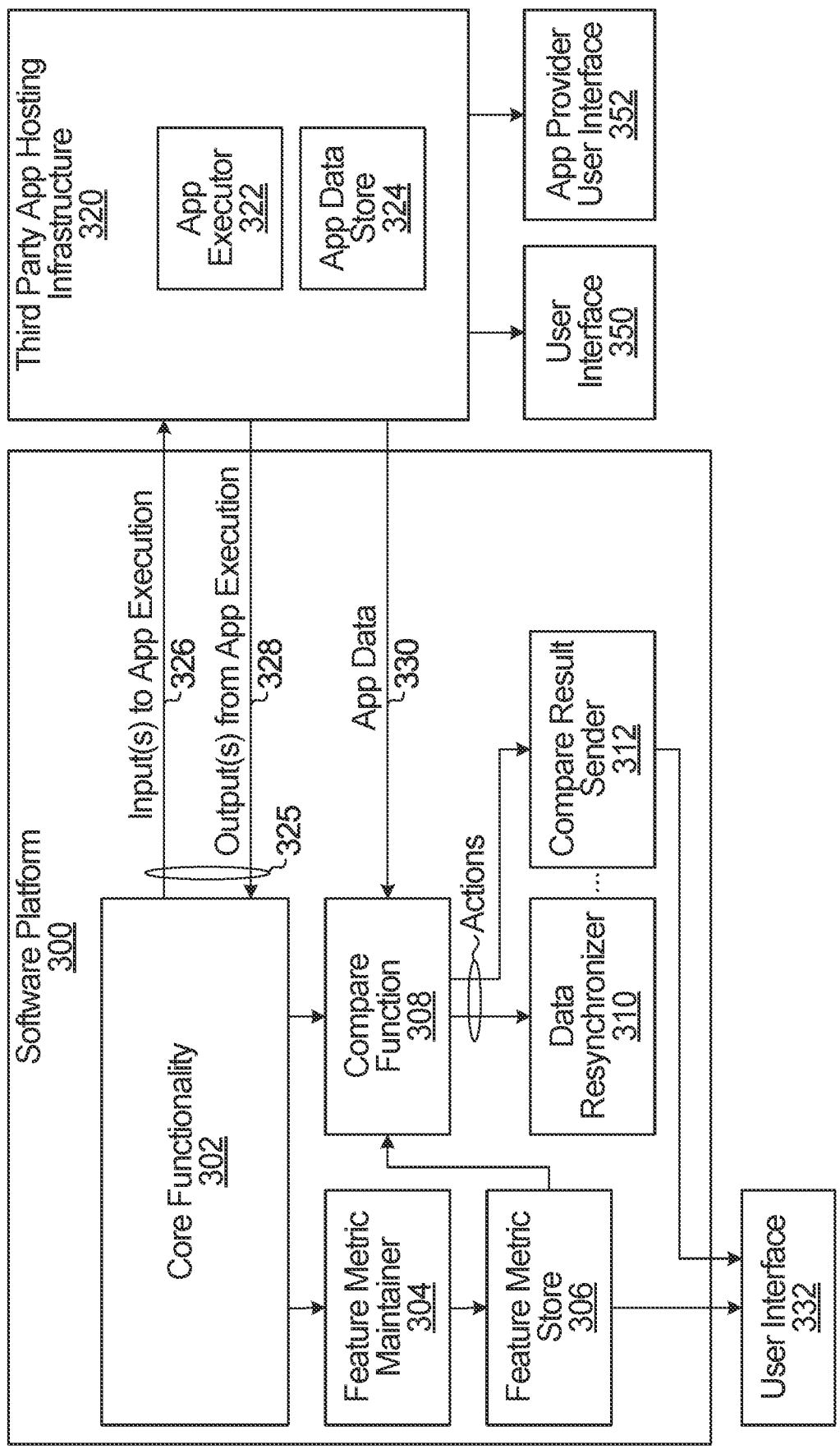
FIG. 2 is a block diagram of a software platform provided by an embodiment of the application.

Referring to FIG. 2, shown is a software platform 300 provided by an embodiment of the application. The software platform 300 may be configured to implement a method similar to that of FIG. 1. In some embodiments, the software platform is a software as a service (SAAS) platform. In some embodiments, the software platform is a commerce platform such as an E-commerce platform. The software platform 300 has core functionality 302 for implementing a service or functionality provided by the software platform 300. Also shown is a third-party app hosting infrastructure 320. The core functionality 302 is extensible in the sense that its functionality can be supplemented with additional functionality provided using apps executed by the third-party app hosting infrastructure 320. The core functionality 302 interacts with the third-party hosting infrastructure 320 through one or more interfaces 325. The interfaces 325 may, for example, be associated with extension points provided within the core functionality 302 or application interfaces provided within the core functionality 302. Via the interfaces 325, the core functionality 302 provides outputs 326 to third-party app execution, and receives inputs 328 from third-party app execution.

The third-party app hosting infrastructure 322 has an app executor 322 for executing a third-party app, and has an app data store 324 for storing app data produced and maintained by the app executor 322 while running the third-party app.

Also shown is a first user interface 332 connected to (or forming part of) the software platform 300. This is a user interface, for users of the software platform to access data maintained by the software platform 325, such as the feature metrics stored in the feature metric store 306 (described below). Also shown is a second user interface 350 connected to the third-party hosting infrastructure. This is a user interface, provided in association with the third-party hosting infrastructure, for users of the third-party app to access app data stored in app data store 324 maintained by the third-party app hosting infrastructure 320. Also shown is an app provider user interface 352 which may be provided for individuals, for example developers, associated with providing the third party app to interact with the third party app hosting infrastructure.

Returning now to the description of the software platform 300, also shown are functional blocks relating to double record keeping of app data, verification and feedback. These include a feature metric maintainer 304 for maintaining metrics based on the inputs 328 from the third-party app hosting infrastructure, and/or based on a flow of events performed by the core functionality that use inputs 328. The metrics are relevant to the functionality/feature being implemented by the third-party app. The metrics are intended to correspond to the app data maintained by the third-party app in the app data store 324. The metrics are stored in the feature metric store 306. Also shown is a compare function 308 which receives inputs from the feature metric store 306, and also receives app data 330 from the third-party app hosting infrastructure. The compare function 308 is shown connected to a data resynchronizer 310 and a compare result sender 312. More generally, there are some number of functional components at the output of the compare function 308 that are associated with different actions that can be triggered by the compare result.

The data resynchronizer 310, when present, synchronizes data between the feature metric store 306, and the third party app data store 324. This can involve additional interaction for the exchange of data between the software platform 300 and the third party app hosting infrastructure 320, not shown.

The compare result sender 312 sends the compared result to specified party or parties, and this may include individuals associated with the software platform (e.g. a merchant) and/or individuals associated with the third party app. This may be sent using a messaging platform, such as e-mail to name a specific example. The recipient of the compare result may then take manual action in an attempt to rectify the situation.

In operation, core functionality 302 is executed. If and when necessary, core functionality 302 passes outputs 326 to the third-party app hosting infrastructure 320 to execute the third-party app using app executor 322. The third-party app is executed based on the outputs 326 from the core functionality 302, and returns inputs 328 to the core functionality.

In some embodiments, the software platform has an extension point, and the step of passing the output and receiving the input from the third-party app in respect of the feature implemented by the third-party app to supplement the core functionality occurs through the extension point.

The third-party app maintains its own data relevant to execution of the third-party app in the app data store 324. Some or all of this data is made available to users through the user interface 350. The app data made available to users through the user interface 350, and/or the app data obtained by the compare function 328, as detailed below, may include one or more aggregated metrics. An aggregated metric is produced by combining data for multiple values, for example, multiple interactions with the third-party app.

The inputs 328 function as input to an orchestration of a flow of events on the software platform. As described previously with reference to FIG. 1, the flow of events on the software platform that may be affected by the input from third-party apps in various ways. Examples include:
  a. Changing a data field;
  b. Filling in a previously empty data field;
  c. Executing a step;
  d. Adding a record; and
  e. Controlling which step is executed next.

Based on the inputs 328 and/or the flow of events, the feature metric maintainer 304 maintains one or more metrics relevant to the feature being implemented by the third-party app, and stores this as feature metric data in the feature metric store 306. The metrics are intended to correspond to data maintained by the third-party app. Some of the feature metric data may be made available to a user through the user interface 332.

The compare function 308 obtains from the third-party app, the data maintained by the third-party app to which the feature metric data is intended to correspond. This may be obtained using various mechanisms, Example mechanisms for making the app data available to the platform include:

Endpoints: part of the app API that allows the platform to read the app data directly from the app;

Push mechanism: the app from time to time, periodically or based on some trigger, sends the app data to the platform;

Pull mechanism: the app sends the app data to the platform upon request.

The compare function 308 performs a comparison based on the obtained data and the at least one metric to produce at least one compare result. The compare function 308 triggers at least one action by the software platform based on the at least one compare result. This may involve triggering resynchronization by the data resynchronizer 310, or triggering the compare result sender 312 to provide the indication of compare result. In some embodiments, one or more indications of the compare result are presented on one or more of the three user interfaces 332,350,352 of FIG. 2. Presenting the indication on the app provider user interface 352 is a mechanism to inform the app provider of the situation such that they can take corrective action.

Figure 3:
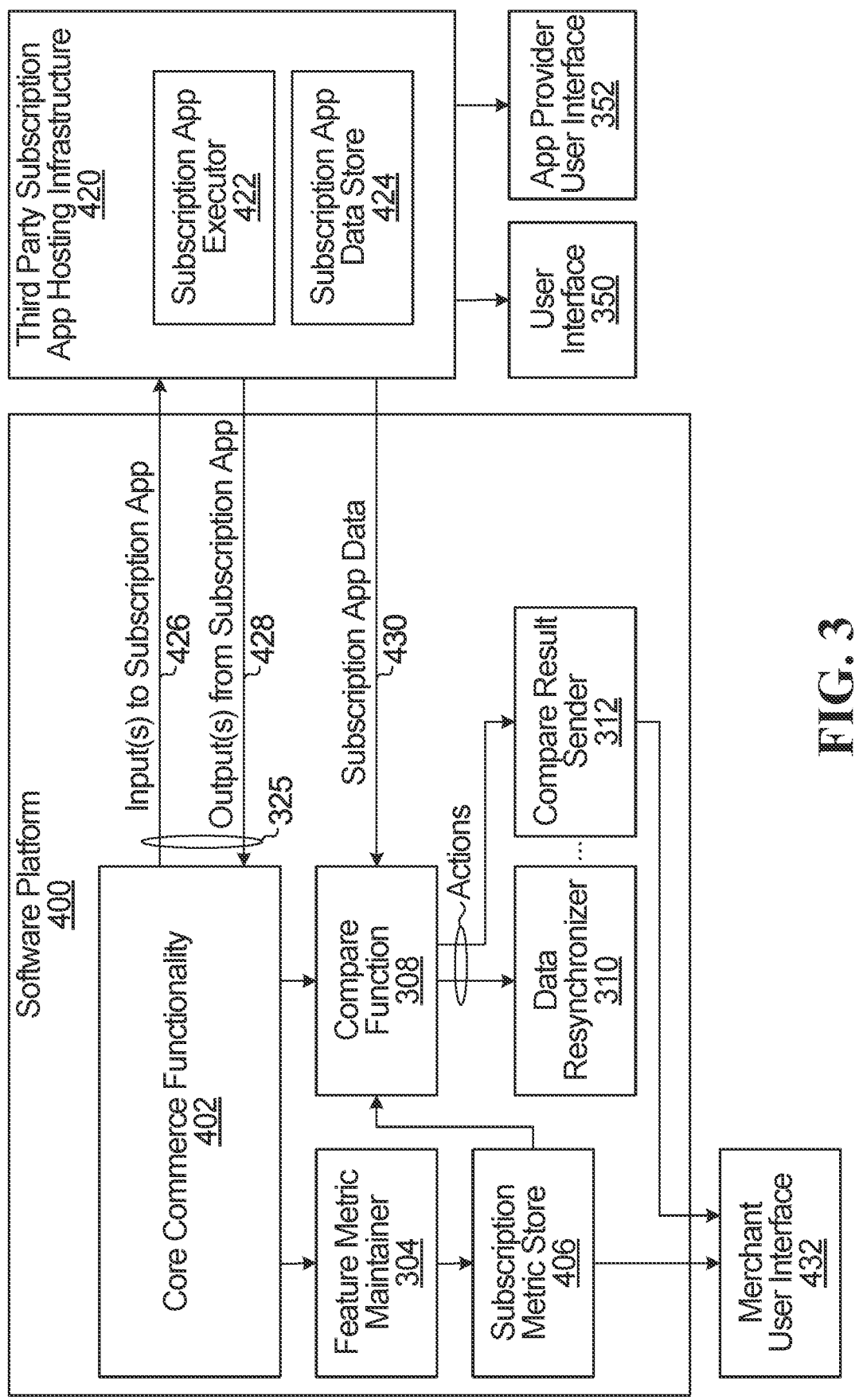
FIG. 3 is a block diagram of a commerce platform provided by an embodiment of the application.

More generally, all the example actions described above with reference to FIG. 1 also apply here. Referring now to FIG. 3, shown is a block diagram of an embodiment specific to a software platform 400 providing commerce functionality, and specific to a situation where the third-party app is one that provides a subscription feature. FIG. 3 is similar to FIG. 2 with the following differences: the core functionality 302 is now core commerce functionality 302; the feature metrics store 306 is now subscription metrics store 406; inputs/outputs 326,328 to/from app execution are inputs/outputs 426,428 to subscription app; user interface 332 is now merchant user interface 432. The third-party app hosting infrastructure 320 is now third-party subscription app hosting infrastructure 420; the app executor 322 is now subscription app executor 422; the app data store 324 is now subscription app data store 424; the app data 330 is now subscription app data 430.

Examples of aggregate subscription metrics that might be maintained in the subscription metrics store 406 include monthly recurring revenue; number of active subscriptions; and number of active subscribers (customers).

An Example E-Commerce Platform

Although integration with a commerce platform is not required, in some embodiments, the methods disclosed herein may be performed on or in association with a commerce platform such as an e-commerce platform. Therefore, an example of a commerce platform will be described.

Figure 4:
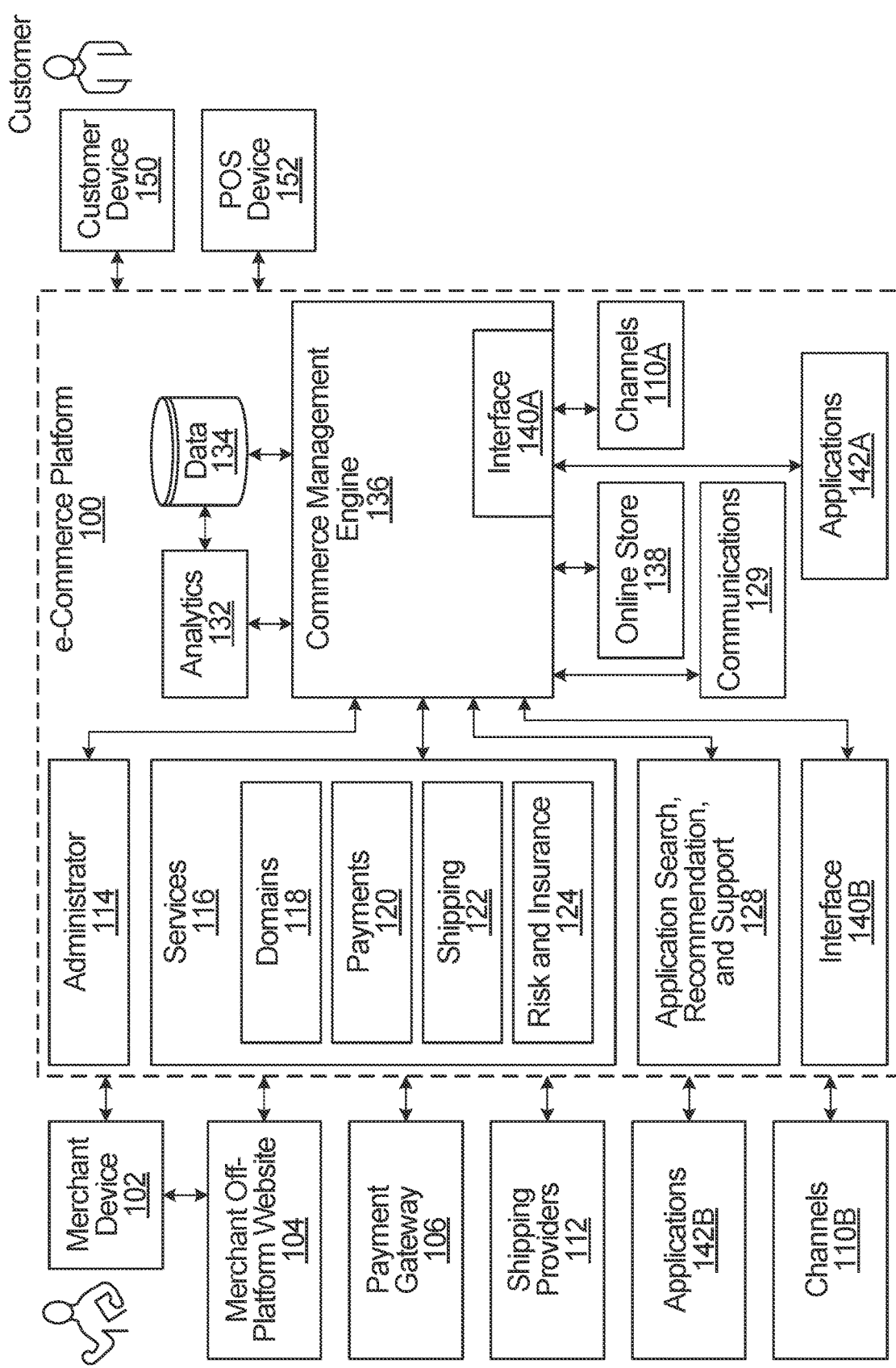
FIG. 4 is a block diagram of an e-commerce platform, according to one embodiment.

FIG. 4 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 4, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network 420 connected to the e-commerce platform 100. For example, the online store 138 may serve or send content in response to requests for data 134 from the customer device 150, where a browser (or other application) connects to the online store 138 through a network 420 using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 5:
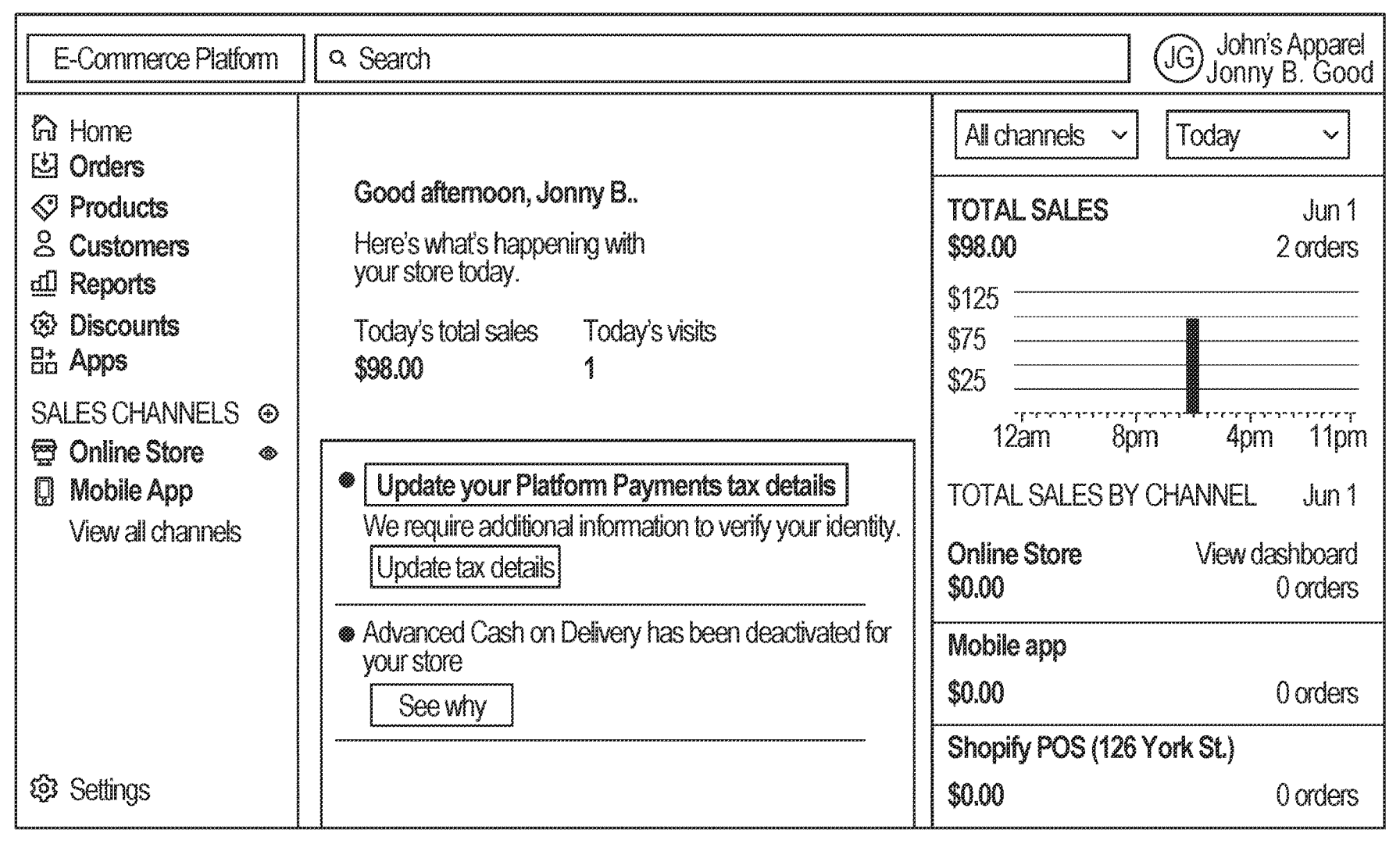

FIG. 5 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Figure 6:
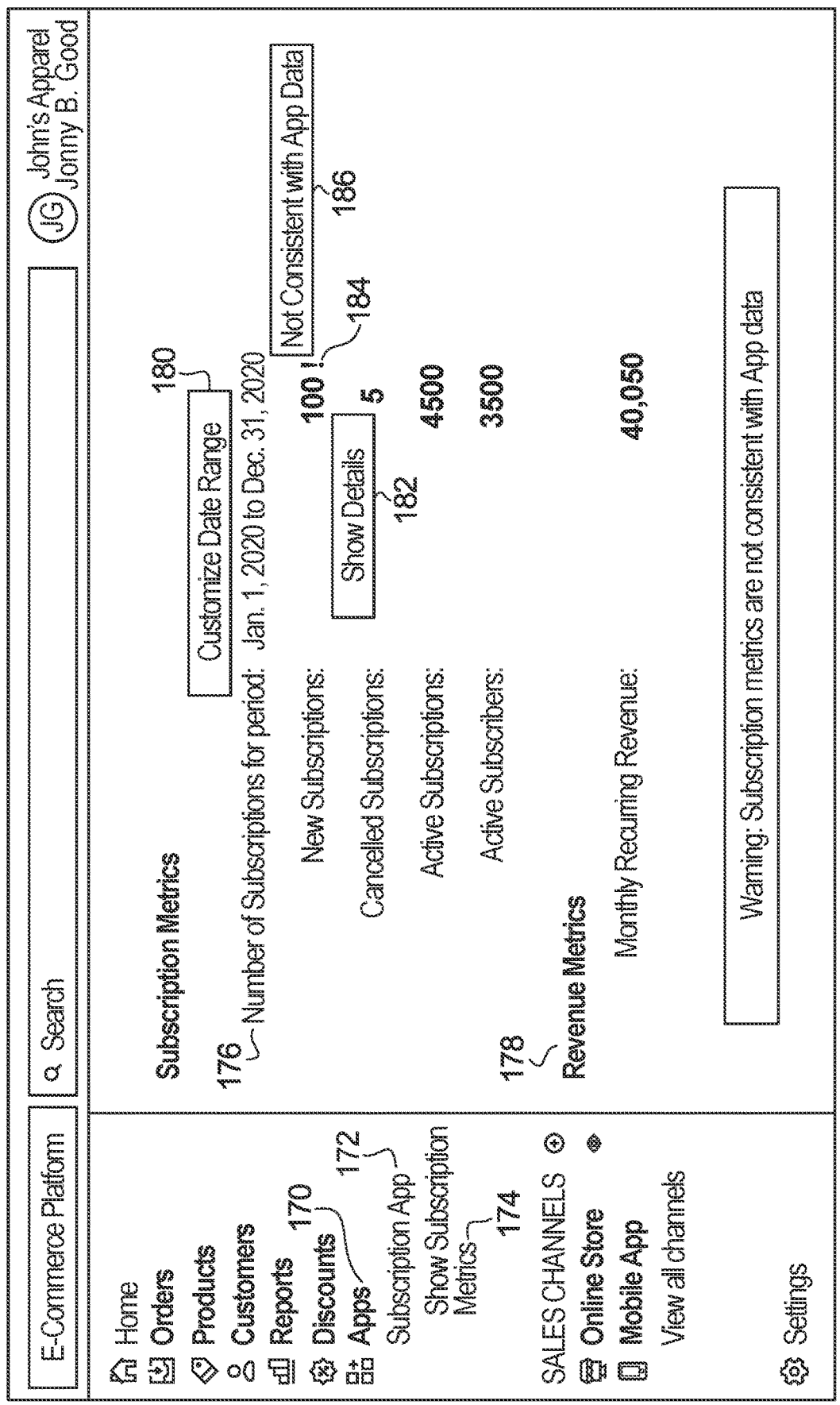
FIG. 6 is an example of a home page of a merchant, according to one embodiment, showing subscription metrics.

Referring now to FIG. 6, shown is an example of a page of a merchant user interface, according to one embodiment, showing subscription metrics. This might, for example, be part of the user interface 332 of FIG. 2. In this example, the particular depicted user interface might, for example, be accessed through a merchant user interface such as described above with reference to FIG. 5. In the example of FIG. 6, the "Apps" menu option 170 can be selected to display a list of apps; in the illustrated example, this includes a Subscription App 172, which when selected, displays a set of sub-options. In the illustrated example, this includes "Show Subscription Metrics" 174, which has been selected, with the result that the main pain of the display now shows a set of subscription metrics. These include metrics 176 pertaining to numbers of subscriptions/subscribers, and metrics 178 pertaining to revenue. This data is generated or maintained based on the orchestrated flow of events that takes place on the commerce platform as a result of interactions with the third-party subscription App. In the background, comparisons are made between this data and app data obtained from the third-party app. The value for "New Subscriptions" is "100" but this is displayed with an exclamation mark 184. Mousing over the exclamation mark causes pop-up window 186 to be displayed which indicates that this particular metric is not consistent with app data. In addition, there is a banner 188 at the bottom of the display indicating that the subscription metrics are not consistent with app data.

In the illustrated example, additional functionality is available by mousing over or mouse clicking on particular fields. In the illustrated example, by mousing over "Number of Subscriptions", the user can set a customized data range using pop-up window 180. By mousing over "cancelled subscription" a user can select "show details" within pop-up window 182, which will show the detailed cancelled subscription information.

Numerous modifications and variations of the present disclosure are possible in light of the above teachings. It is therefore to be understood that within the scope of the appended claims, the disclosure may be practiced otherwise than as specifically described herein.

The invention claimed is:

1. A computer-implemented method comprising:
receiving, in a software platform providing core functionality, input from a third-party application in respect of a feature implemented by the third-party application to supplement the core functionality, the input being input to an orchestration of a flow of events by the core functionality on the software platform;
identifying discrepancies in in respect of functionality provided by the third-party application by:
based on one or both of the input and the flow of events, maintaining, by the software platform separately from data maintained by the third-party application, at least one metric relevant to the feature being implemented by the third-party application, the at least one metric intended to correspond to the data maintained by the third-party application;
obtaining, by the software platform providing core functionality, from the third-party application, the data maintained by the third-party application and to which the at least one metric is intended to correspond;
performing, by the software platform providing core functionality, a comparison based on the obtained data and the at least one metric to produce at least one compare result; and
triggering, by the software platform providing core functionality, at least one corrective action by the software platform based on the at least one compare result;
wherein triggering at least one action by the software platform based on the at least one compare result comprises triggering an action when there is a mismatch between the obtained data and the at least one metric that exceeds a defined tolerance.

2. The method of claim 1 wherein the software platform has an extension point, and wherein the step of receiving input from a third-party application in respect of a feature implemented by the third-party application to supplement the core functionality occurs via the extension point.

3. The method of claim 1 wherein triggering at least one action by the software platform based on the at least one compare result comprises triggering an action when there is a match, or a match within a defined tolerance, between the obtained data and the at least one metric.

4. The method of claim 1 wherein the at least one triggered action comprises a corrective action.

5. The method of claim 4 wherein the corrective action is one of:
an action to resynchronize a state of the application and the software platform;
one or more self-healing actions to rectify an inconsistency; or sending an automated request to the application requesting that a most recent set of events be re-sent by the application to the software platform.

6. The method of claim 1 wherein the at least one action comprises providing an indication of the compare result.

7. The method of claim 6 wherein providing an indication of the compare result comprises:
informing the application or a person associated with the application of the compare result;
transmitting a message to an application developer informing the application developer of the compare result; and
informing a user of the software platform of the compare result.

8. The method of claim 1 further comprising:
making one or more of said at least one metric or information based on one or more of said at least one metric available to a user through a user interface of the software platform.

9. The method of claim 8 wherein making the at least one metric available to a user through a user interface of the software platform comprises making the at least one metric available through a store administration user interface.

10. The method of claim 1 wherein the software platform is a commerce platform, and the feature implemented by the third-party application is a subscription feature.

11. The method of claim 10 wherein the at least one metric comprises:
monthly recurring revenue;
number of active subscriptions;
number of active subscribers (customers).

12. The method of claim 1 wherein obtaining application data from the third-party application comprises obtaining application data from the third-party application using at least one of:
one or more endpoints;
a push mechanism; or
a pull mechanism.

13. The method of claim 1 wherein the application data comprises at least one aggregated metric.

14. An apparatus comprising:
a processor and a memory, the apparatus configured to execute a method comprising:
receiving, in a software platform providing core functionality, input from a third-party application in respect of a feature implemented by the third-party application to supplement the core functionality, the input being input to an orchestration of a flow of events by the core functionality on the software platform;
identifying discrepancies in in respect of functionality provided by the third-party application by:
based on one or both of the input and the flow of events, maintaining, by the software platform separately from data maintained by the third-party application, at least one metric relevant to the feature being implemented by the third-party application the at least one metric intended to correspond to the data maintained by the third-party application;
obtaining, by the software platform providing core functionality, from the third-party application, the data maintained by the third-party application and to which the at least one metric is intended to correspond;
performing, by the software platform providing core functionality, a comparison based on the obtained data and the at least one metric to produce at least one compare result; and
triggering, by the software platform providing core functionality, at least one corrective action by the software platform based on the at least one compare result;
wherein triggering at least one action by the software platform based on the at least one compare result comprises triggering an action when there is a mismatch between the obtained data and the at least one metric that exceeds a defined tolerance.

15. The apparatus of claim 14 wherein the software platform has an extension point, and wherein the step of receiving input from a third-party application in respect of a feature implemented by the third-party application to supplement the core functionality occurs via the extension point.

16. The apparatus of claim 14 wherein the at least one triggered action comprises a corrective action.

17. The apparatus of claim 16 wherein the corrective action is one of:
an action to resynchronize a state of the application and the software platform;
one or more self-healing actions to rectify an inconsistency; or
sending an automated request to the application requesting that a most recent set of events be re-sent by the application to the software platform.

18. A computer-readable medium having instructions stored thereon that, when executed by a computer, cause the computer to perform a method comprising:
receiving, in a software platform providing core functionality, input from a third-party application in respect of a feature implemented by the third-party application to supplement the core functionality, the input being input to an orchestration of a flow of events by the core functionality on the software platform;
identifying discrepancies in in respect of functionality provided by the third-party application by:
based on one or both of the input and the flow of events, maintaining, by the software platform separately from data maintained by the third party application, at least one metric relevant to the feature being implemented by the third-party application the at least one metric intended to correspond to the data maintained by the third-party application;
obtaining, by the software platform providing core functionality, from the third-party application the data maintained by the third-party application and to which the at least one metric is intended to correspond;
performing, by the software platform providing core functionality, a comparison based on the obtained data and the at least one metric to produce at least one compare result; and
triggering, by the software platform providing core functionality, at least one corrective action by the software platform based on the at least one compare result;
wherein triggering at least one action by the software platform based on the at least one compare result comprises triggering an action when there is a mismatch between the obtained data and the at least one metric that exceeds a defined tolerance.

19. The computer readable medium of claim 18 wherein the at least one triggered action comprises a corrective action.

20. The computer readable medium of claim 18 wherein the corrective action is one of:
an action to resynchronize a state of the application and the software platform;

one or more self-healing actions to rectify an inconsistency; or sending an automated request to the application requesting that a most recent set of events be re-sent by the application to the software platform.

\* \* \* \* \*